Figure 1:
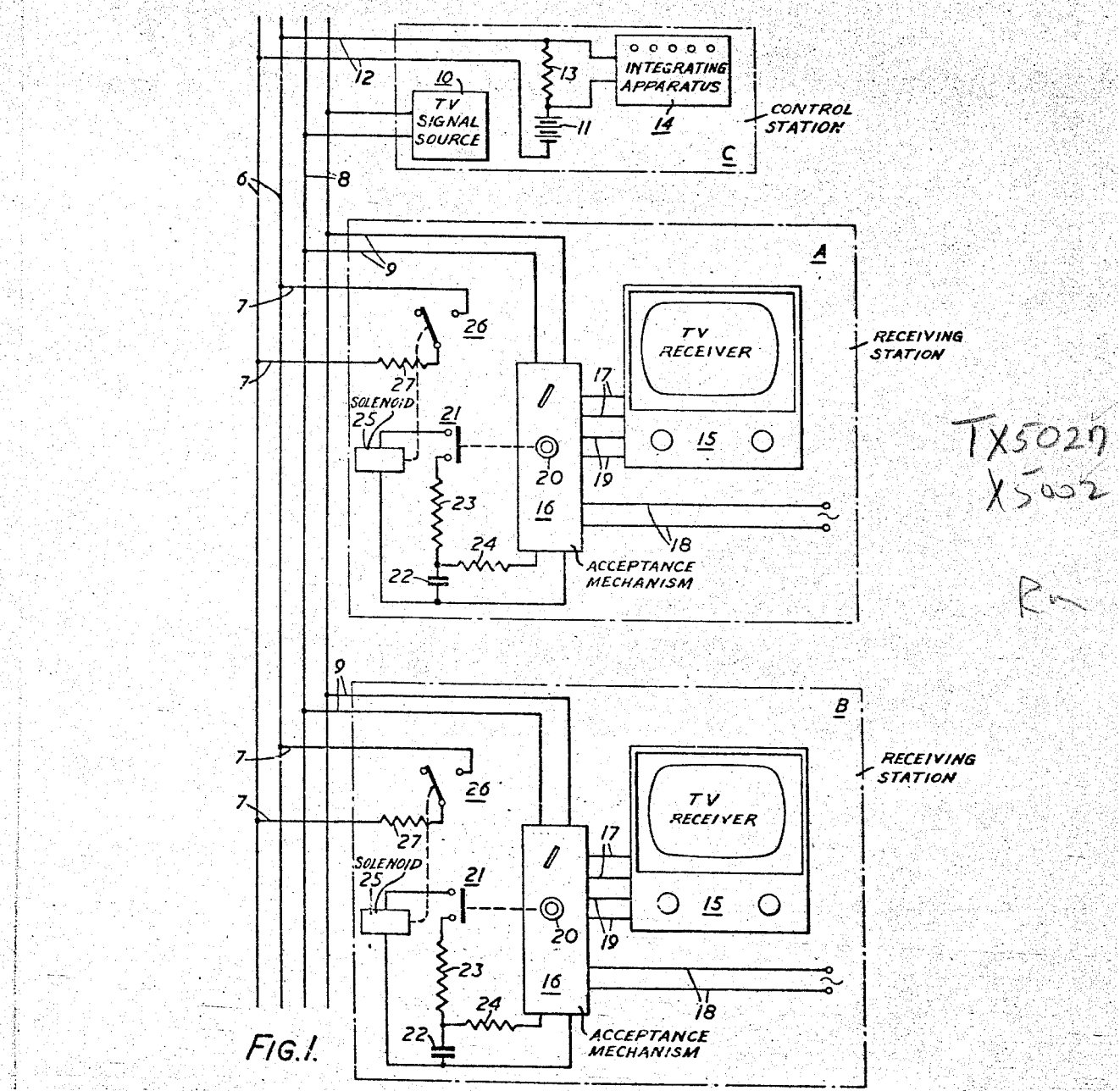

Oct. 25, 1966 P. BASS 3,281,695
BROADCAST DISTRIBUTION SYSTEM WITH CENTRAL STATION
INDICATION OF TOTAL NUMBER OF ENERGIZED RECEIVERS
Filed March 13, 1963 3 Sheets-Sheet 2

INVENTOR
Patrick Bass
BY

INVENTOR
Patrick Bass

United States Patent Office 3,281,695
Patented Oct. 25, 1966

3,281,695
BROADCAST DISTRIBUTION SYSTEM WITH CENTRAL STATION INDICATION OF TOTAL NUMBER OF ENERGIZED RECEIVERS
Patrick Bass, London, England, assignor to R. & R. Research Limited
Filed Mar. 13, 1963, Ser. No. 264,870
Claims priority, application Great Britain, Mar. 21, 1962, 10,775/62
11 Claims. (Cl. 325—31)

This invention is concerned with television or other broadcasting systems, including both radio and wired broadcasting systems.

The adoption of broadcasting for advertising purposes or the organization and operation of a broadcasting system in a manner which requires the listener or viewer to pay for the reception of programme features makes it desirable to be able to obtain a substantially accurate indication of programme popularity, that is to say an indication which is representative of the number of receiving equipments conditioned to receive a particular transmission.

Broadcasting systems have been proposed in which such programme popularity indicating facilities are based upon the technique of producing an electric pulse, which is representative of the fact that a receiving equipment at a receiving station has been conditioned for use within a period of time allotted to the transmission of a particular programme feature, and the counting of such pulses in order to establish an indication which is representative of the number of such equipments which have been so conditioned within said period of time. With such known systems the presence of two or more such pulses simultaneously, corresponding to two or more receiving equipments having been conditioned for use within the duration time of a single pulse, would be conducive to inaccuracy and it is the object of the present invention to provide programme popularity indicating arrangements which are substantially immune from this disadvantage in that a plurality of programme popularity signals can in fact occur simultaneously without impairing the accuracy of the programme popularity indications.

In a broadcasting system according to one aspect of the present invention there is included an integrating apparatus capable of registering the time integral of an electrical quantity which is applied as an input thereto, at each of a plurality of receiving stations a receiving equipment which can be brought to a predetermined condition to provide satisfactory reception of a transmission, at each such station an electrical switching means which, if the receiving equipment is so conditioned within a period of time allotted to the said transmission, is operative to provide as an input to said integrating apparatus an electrical quantity which is representative of the fact that the equipment has been so conditioned, all such electrical quantities having substantially the same predetermined time integral, and means whereby said integrating apparatus serves to establish an indication which is representative of the sum of the time integrals of such electrical quantities as are applied thereto and therefore of the number of the receiving equipments which have been so conditioned within said period of time.

Although any one of several different arrangements can be adopted for producing the said electrical quantity, which in effect constitutes a programme popularity pulse, including for example the introduction of a locally produced electric pulse into a telephone or other signalling channel available at a receiving station, it is believed that the greatest accuracy will be attained by using the said switching means at each of the receiving stations to modify the electrical condition of a conductive network which is common to all such stations. Thus in a television or other broadcasting system according to another aspect of the present invention there is included an integrating apparatus capable of registering the time integral of an electrical quantity which is applied as an input thereto, an electrically conductive network which serves to interconnect a plurality of receiving stations, at each such station a receiving equipment which can be brought to a predetermined condition to provide satisfactory reception of a transmission, at each such station an electrical switching means which, if the receiving equipment is so conditioned within a period of time allotted to the said transmission, is operative to impose an electrical load upon the said network and thereby produce as an input to said integrating apparatus an electrical quantity which is representative of the fact that the equipment has been so conditioned, all of such electrical quantities having substantially the same predetermined time integral, and means whereby said integrating apparatus serves to establish an indication which is representative of the sum of the time integrals of such electrical quantities as are applied thereto and therefore of the number of the receiving equipments which have been so conditioned within said period of time.

Conveniently the said electrical quantities are electric pulses of strictly determined duration obtained by arranging the said switching means under the control of a timing device, for example under the control of a cam which is actuated by a synchronous electric motor. In one such arrangement a time controlled rotary cam serves to operate a switching means which applies a load to a network which includes the input terminals of the integrating apparatus and is energized from a suitable constant voltage source, maintains this load for a predetermined duration, say for example two seconds, and then removes this load from the network. In this way and given that the loading imposed in respect of each receiving station is the same, programme popularity pulses can be produced in respect of each of the stations and all of these pulses, as applied to the integrating apparatus, will have the same predetermined time integral though not necessarily the same waveform.

Figure 2:
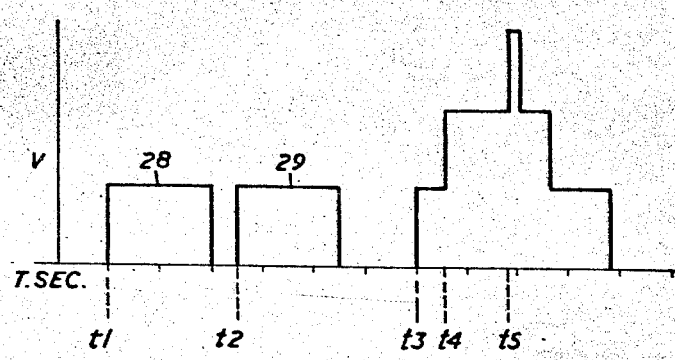
Figure 3:
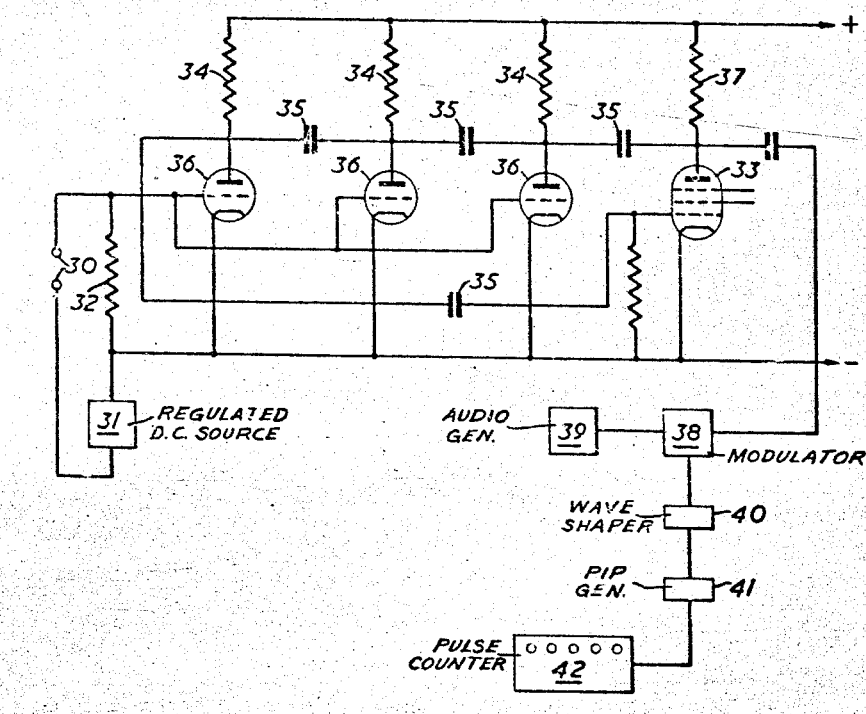
Figure 4:
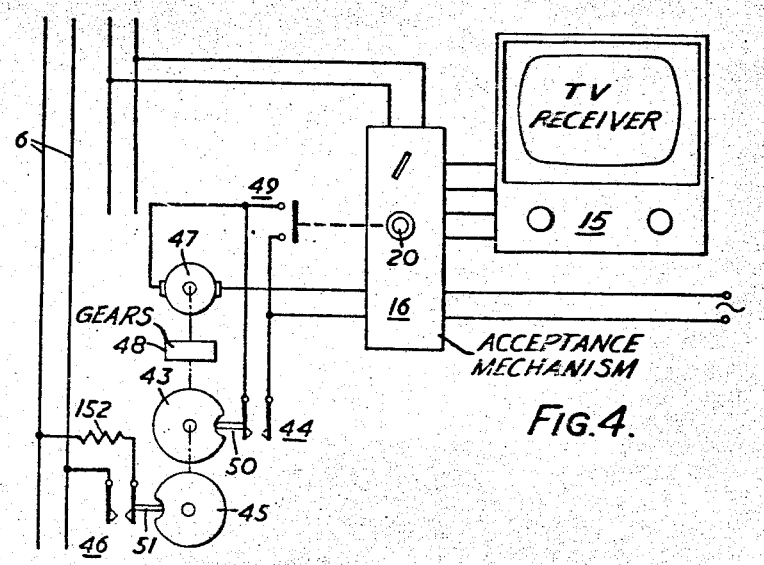
Figure 5:
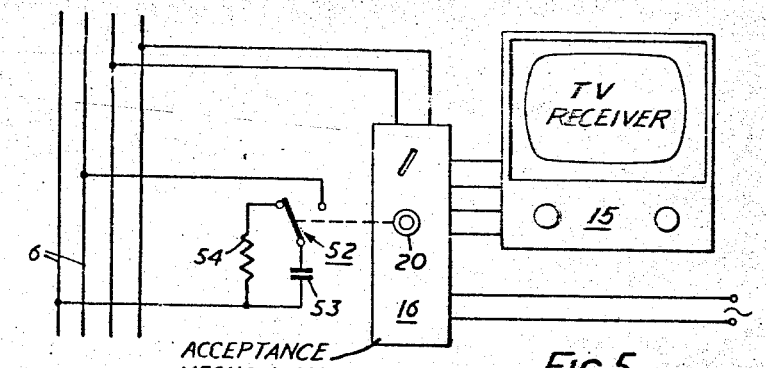
Figure 6:
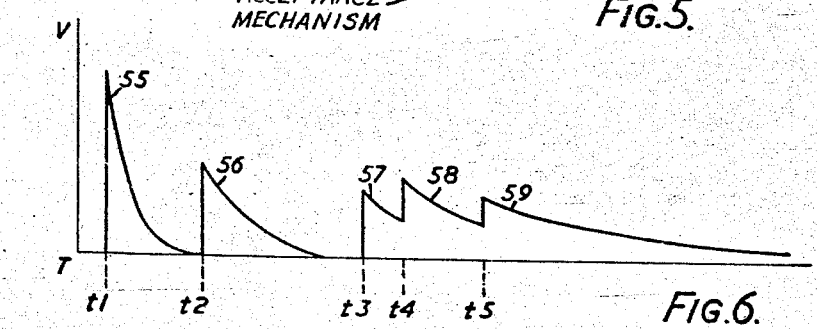

In order that the invention more readily can be understood it will now be described, merely by way of example, with reference to the accompanying drawings wherein:

FIG. 1 shows, in diagrammatic manner, a wired broadcasting system according to one preferred embodiment of the invention, FIG. 2 is a graph illustrating a group of programme popularity pulses such as may occur in the system shown in FIG. 1, FIG. 3 shows, in diagrammatic manner, a preferred form of integrating apparatus for use in establishing the required indication of programme popularity, FIG. 4 shows, in diagrammatic manner, a modified form of receiving station equipment, FIG. 5 shows, in diagrammatic manner another modified form of receiving station equipment, and FIG. 6 is a graph illustrating a group of programme popularity pulses such as may occur in a broadcasting system comprising receiving equipment as shown in FIG. 5.

The system shown in FIG. 1 provides programme popularity indication facilities in respect of pay-type television transmissions for the purpose of obtaining a measure of the relative interest created by different programme features, of establishing an indication upon the basis of which the revenue collected in respect of a number of programme features can be allocated amongst different interested parties or of establishing an indication against which the aggregate of a number of individual records produced in respect of the use of each of a group of receiving equipments can be checked.

In this particular system an electrically conductive network, comprising a pair of main conductors 6 and corresponding pairs of branch conductors such as 7 are provided, each of these pairs of branch conductors serving to connect receiving stations to the main conductors 6. Although only two receiving stations are shown, namely the stations designated A and B respectively, it is to be understood that the system would in practice include a large number of such receiving stations which might be distributed over a large area and that the network comprising the main and branch pairs of conductors would serve to interconnect all of these stations so that the network is common to all such stations.

This system also includes a feeder line 8 over which television signals are distributed in any desired suitable manner well known in the art, for example as modulated carrier wave signals, and drop-in conductors 9 couple, also in any well known manner, the receiving stations such as A and B with this feeder 8.

At a suitable location, for example at a control station C of the system, there is provided a source 10 of television signals which are applied to the feeder 8. Also at this control station there is provided a source of D.C. potential (10–50 volts), which is shown merely for convenience as a battery 11, for energising the conductive network comprising the conductors 6 and 7. This battery 11 is permanently connected with the network through leads 12 and by way of a series connected resistor 13 across which programme popularity pulses produced in this network are made evident. An electronic integrating apparatus 14, which is provided at the control station and receives an input from across the resistor 13, includes means whereby it can establish an indication which is representative of the sum of the time integrals of the pulses available from across the resistor 13. Suitable forms of integrating apparatus which can be adopted for this purpose hereinafter will be referred to in greater detail.

There is provided at each of the receiving stations, such as A and B, a receiving equipment which can be brought to a predetermined condition to provide satisfactory reception of the television signals being distributed over the wire network which comprises the feeder 8. This receiving equipment includes a television receiver 15 which can be of any desired suitable domestic type and is coupled electrically with the drop-in 9 of the television signal network through the intermediary of an apparatus 16 which, in known manner, enables the user of receiving station equipment to in some way signify or acknowledge acceptance of any particular programme feature. Thus for example this apparatus may comprise basically a coin-accepting mechanism, a push button or other personally operable element which the user can actuate when he wishes to signify or acknowledge his acceptance of a particular transmission and in some cases such personal intervention can in known manner result in the production of a record which is indicative of such acceptance of the transmission. For convenience in describing this embodiment of the invention it is being assumed that this apparatus 16 is in the form of a coin-accepting apparatus of any known suitable kind which enables a user of the station equipment to obtain satisfactory reception of particular programme features only when a demand for a specific fee has been satisfied. This coin-accepting apparatus 16 receives an input from the television signal network by way of the drop-in wires 9, provides a corresponding input to the receiver 15 by way of wires 17, is adapted to be connected to a local power supply main by leads 18 and this supply is made available to the receiver 15 by way of leads 19. This apparatus 16 also is such that if the user of a receiving equipment, for example that of station A, has met the demand of the apparatus for the insertion thereinto of a certain value of coinage, satisfactory reception of the transmission will be made available if the user then actuates a push button 20 to accept the transmission. This actuation of push button 20 also serves to close the contacts of a switch 21 which is arranged in an electrical timing circuit which forms a part of the apparatus 16 and includes a capacitor 22, resistors 23 and 24 and the winding of a solenoid 25. This timing circuit is connected to a source of D.C. potential which is made available in the apparatus 16 as a result of rectifying an input which is obtained from the local A.C. power supply by way of the leads 18. The arrangement of this timing circuit is such that the capacitor 22 is charged from the source of D.C. potential through the resistor 24 and, when the switch 21 is closed as the push button 20 is operated to condition the receiving equipment to accept a transmission, this capacitor discharges through the solenoid 25 at a rate which is determined by the resistor 23. This solenoid 25 controls a switch 26 and the energisation of this solenoid 25, as the capacitor 22 discharges through the resistor 23, is sufficient to move the switch 26 from its normal position, shown on the drawing, to its operated position where it serves to connect a resistor 27 between the branch conductors 7 and therefore across the conductive network. After an interval, say two seconds, which is determined primarily by the values of the capacitor 22 and the resistors 23 and 24, the energisation of solenoid 25 will be reduced to a value which is insufficient to maintain the switch 26 in its operated condition and this switch will, in returning to its normal position, remove the loading resistor 27 from across the network. Thus it will be seen that the energisation of the solenoid 25 and the operation of the switch 26 is dependent upon the receiving equipment being conditioned to receive a transmission and in particular upon the conditioning of the coin-accepting apparatus 12. Furthermore as a result of connecting the resistor 27 across the conductive network for a period of time determined by the timing circuit through which the solenoid 25 is energised an electrical load is imposed upon the network such as to produce an electrical quantity, in the form of a pulse, across the resistor 13, this electrical quantity having a predetermined time integral and all such quantities, that is to say corresponding electrical quantities pertaining to the receiving equipments of other such receiving stations, will have the same predetermined time integral. These electrical quantities appear, as programme popularity pulses, across the resistor 13 and are applied as an input to the integrating apparatus 14 which registers the time integral of each such electrical quantity and establishes an indication which is representative of the sum of the time integrals of such electrical quantities as are applied thereto with any period of time and therefore of the number of the receiving equipments which have been brought, within said period of time, to a predetermined condition to provide satisfactory reception of a transmission.

The manner in which this arrangement can cope with the application to the integrating apparatus of the programme popularity pulses is illustrated graphically in FIG. 2, it being assumed, merely for convenience, that these pulses as presented to the integrating apparatus are of rectangular waveform. The graph shows two pulses 28 and 29, commencing at times $t1$ and $t2$ respectively, which are time spaced sufficiently far apart to enable the integrating apparatus to deal with each pulse separately and register two pulses. However, the next succeeding pulse, commencing at $t3$, is quickly followed by two more pulses commencing at $t4$ and $t5$ respectively, all these three pulses commencing within a period of time less than the duration of a single pulse. Insofar as these three pulses are concerned it will be seen that despite their concurrent occurrence the integrator will function to obtain the time integral of the stepped wave pulse applied thereto and register it as three pulses. Therefore insofar as all the pulses shown in the graph are concerned the integrating apparatus will ascertain the sum of the time integrals of the two separate pulses and the three concurrent pulses and register these to provide an indication which is representative of this sum, namely an indication representative of the fact that during this period of time five receiving equipments have been conditioned to obtain satisfactory reception of a transmission.

In general the pulse integrating will be restricted to the period of time which is allotted to the transmission of each particular programme feature and the apparatus 16 will include means (not shown) whereby at the end of each such period it can be reverted to its normal condition for which satisfactory reception cannot be made until such time as a further monetary demand in respect of another programme feature has been met and this further feature has been accepted by operation of the acceptance push button 20. This reversion to normal condition of the apparatus 16 can be arrranged under the control of a signal, such for example as an audio frequency tone signal distributed over the television signal network; this signal also can be used to reset the integrating apparatus 14 at the control station. The push button 20 is interlocked in a manner such that once it has been operated, to accept a programme feature, it cannot again be operated in respect of this same programme feature and pending some predetermined action such as replenishment of a depleted coin deposit and/or the reception of a resetting signal from the control station of the system.

In some cases the integrating apparatus 14 also can include means for obtaining a permanent record of the number of programme popularity pulses registered thereby. Furthermore this integrating apparatus can include further registering means for obtaining an indication representative of the aggregate number of programme popularity pulses received in respect of a succession of programme feature periods.

In alternative embodiments the apparatus 16 does not include coin-accepting mecahnism but includes recording means which serves to produce a record of the use of the equipment, under the control of the programme acceptance push button 20, this record enabling the user of the equipment to be billed on a credit basis with the cost of the programme features which have been accepted.

In some cases the conductive network in which the programme popularity pulses are produced can be energised by alternating current.

It is of course to be understood that although the system illustrated in FIG. 1 is limited to the distribution of a single programme, the application of the invention is not so restricted and equally well can be applied in respect of multi-programme systems. In the case of radio wave signals the signal input to the apparatus 16 would be made by way of an antenna and this apparatus might incorporate unscrambling means for rendering intelligible, for example under coin control, a scrambled transmission.

A preferred form of integrating apparatus for registering the time integral of the programme popularity pulses is shown in FIG. 3 and comprises terminals 30 to which leads, such as the leads 12 of FIG. 1, of a suitable conductive network are connected, a D.C. source 31 of regulated voltage and a resistor 32 which is included in series with the D.C. source 31 and the network so that a load placed at any position across this network will draw current through this resistor. The potential difference made available across this resistor 32, as a result of predetermined loading of the network as receiving equipments are conditioned for use, is used to control the frequency of operation of a first audio frequency electric wave oscillation generator. This first generator comprises an electronic valve 33, of the pentode type, between the anode and control grid of which there is arranged a resistive/capacitive phase-shift network formed by resistors 34 and capacitors 35. Each of the resistors 34 is in effect shunted by the cathode/anode path of an electronic valve 36 of the triode type and the frequency of operation of this oscillator is varied as the voltage applied to the control grids of these valves from across the resistor 32 is varied. The pentode valve 33 is provided with an anode load resistor 37 from across which the audio frequency output wave is obtained for application to a modulator 38.

A second audio frequency electric wave oscillation generator, 39, is adapted to operate at a fixed frequency and the output from this generator also is applied to the modulator 38 in order to obtain, as an output from the latter, a heterodyne signal the frequency of which corresponds to the prevailing difference between the frequencies of operation of these two electric wave generators. With advantage the oscillation generator 39 is a replica of the generator for obtaining the first audio frequency wave but instead of controlling its frequency of operation by providing a varying potential between the control grid and cathodes of its phase controlling valves there can be applied a potential the value of which can be adjusted for the purpose of establishing a predetermined relationship between the frequency of operation of the two generators when initially setting up the apparatus for use.

The heterodyne signal obtained from the modulator 38 is applied to a wave shaper 40 to obtain a square wave from the sinusoidal heterodyne signal, a pip generator 41 which produces a pulse signal from the square wave input thereto, and a pulse counter 42 which serves to establish a display which is representative of the count of such pulses and therefore the number of cycles of the heterodyne signal which is produced as the output of the modulator 38.

The initial setting up of this integrating apparatus is such that in the absence of any current flow through the resistor 32 the first and second oscillation generators operate at the same frequency, the frequency of the output from the modulator 38 will be zero and the counter 42 will accordingly not receive an operative input. Upon a flow of current through the resistor 32, corresponding to a receiving equipment at a receiving station having been conditioned to receive a particular programme, the potential available across the resistor 32 will be such that the frequency of operation of the first oscillation generator will be increased to a predetermined extent. For example, the arrangement may be such that for each incremental increase of one volt across the resistor 32, corresponding to the predetermined amplitude of a programme popularity pulse, there is a frequency increase of 100 c./s. in the output from the first audio frequency generator throughout the range of operation of the apparatus. Accordingly, there is obtained from the modulator 38 a signal the frequency of which is representative of the prevailing potential across the resistor 32 and the counter 42 will count the cycles of this heterodyne signal and establish a display which is indicative of the time integral of the said potential. Within its range of operation this integrating apparatus can cope with a plurality of programme popularity pulses which commence within the duration of a single such pulse, the counter 42 establishing a display which is indicative of the number of such pulses.

In another embodiment of the invention an integrating apparatus of the electrical charge-storage type is employed, the potential differences corresponding to programme popularity pulses being used to control the flow of electrons to a capacitor which is arranged in the anode circuit of a suitable electronic valve, the value of the charge in this capacitor being indicated for example on a high impedance valve volt meter and being representative of the sum of the time integrals of the programme popularity pulses produced in a given time.

In the alternative form of receiving station equipment shown in FIG. 4, motor driven cams replace the electrical timing circuit of the arrangement shown in FIG. 1, for determining the duration of each programme popularity pulse. Two such cams are provided, namely cam 43 which is associated with contacts 44 and cam 45 which is associated with contacts 46. These cams are arranged to be driven by a synchronous electric motor 47 by way of a speed-reducing gear 48. This motor is adapted to be energised from the A.C. power supply available in the apparatus 16 and is under the joint control of a switch 49 and the contacts 44. Switch 49 is adapted to be closed momentarily when the push button 20 of apparatus 16 is actuated, to accept a particular transmission, and the motor 47 then commences to move the cams from their normal position of rest (as shown in the drawing) and cause the cam followers 50 and 51 of the contacts 44 and 46 respectively to close these contacts. This closure of the contacts 44 ensures that the motor 47 will remain energised after the initial momentary closure of the switch 49 and until the cam 43 has completed one revolution to again bring it into its normal position, for which condition the contacts 44 will open and cause the motor to stop. During this period of rotation of the cams, the cam 45 ensures that the contacts 46 remain closed until this cam again comes into its normal position whereupon the contacts 46 will open. During the time that the contacts 46 are closed a resistor 152 is connected between the conductors 6 of the network of the system and hence will impose a load upon this network to produce a programme popularity pulse in the same manner and for the same purpose as that hereinbefore described with reference to FIG. 1. In this case the apparatus 16 will include latching means to prevent a second operation of the push button pending the reception at the receiving station of a resetting signal.

As an alternative to using a resistor as a pulse-producing load on the network, it is possible to adopt a capacitive load for this purpose and one such arrangement is included in the modified receiving station equipment shown in FIG. 5. In this arrangement the push button 20 of the apparatus 16 is adapted to actuate a switch 52 which, in its normal position, serves to connect a capacitor 53 (1–10 mf.) across a discharging resistor 54. When the push button 20 is operated to signify a user's acceptance of a particular transmission, this switch 52 serves to disconnect the discharged capacitor 53 from across the resistor 54 and connect it across the conductors 6 of the wire network of the system. This results in a flow of charging current in the network as the capacitor is charged and the production of a corresponding pulse across the series connected resistor (13 in FIG. 1) of the network and which provides the input to the integrating means of the system. By adopting the same value of capacitance for the pulse-producing capacitor of each receiving equipment of the system, each pulse whilst being of different waveform will have the same time integral and the integrating apparatus will operate to establish an indication which is representative of the sum of the time integrals of the pulses it receives and hence of the number of operating station equipments which have accepted a particular transmission. The capacitor 53 can remain across the network until such time as a resetting signal for resetting the apparatus 16 releases the push button 20 and returns the switch 52 to its normal position for which the capacitor is discharged across the resistor 54 so that it is ready in a discharged condition for further use as a pulse-producing load when the equipment is conditioned to accept another transmission.

The form of the programme popularity pulses made available across the series connected resistor at the input to the integrating apparatus of the system is illustrated graphically in FIG. 6. This graph shows the first two pulses 55 and 56 of a series, these pulses commencing at times $t1$ and $t2$ respectively which are spaced sufficiently apart to enable the integrating apparatus to deal with each pulse separately and register that two receiving equipments have been conditioned to receive a particular transmission. The next three pulses, 57, 58 and 59, commencing at times $t3$, $t4$ and $t5$ respectively occur sufficiently close together as to overlap to a considerable extent but nevertheless the time integral of each pulse is the same and the two integrating apparatus will register this combination pulse as three pulses and indicate that three further receiving equipments have been conditioned to receive the particular transmission.

What I claim is:
1. A broadcast receiving system comprising in combination:
 (a) a central station including means for generating program signals of predetermined duration and electric integrator means operable to develop an indication representing the integral over said predetermined duration of the current flowing therethrough,
 (b) a plurality of receiving stations, each station including program signal receiving means, control means operable to bring said receiving means to a predetermined condition to provide satisfactory reception of said program signals, switch means actuated by said control means when so operated, and load means,
 (c) means making said program signals available at said receiving stations, and
 (d) an electric circuit including a source of electric direct current, said electric circuit connecting each of said receiving stations to said central station,
  (1) said load means being each adapted to draw appreciable current from said circuit over a predetermined period of time substantially shorter than said program duration, said current having over said period a predetermined value of time integral,
  (2) said switch means being each adapted when actuated by operation of said control means to connect the respective said load to draw current from said electric circuit,
  (3) whereby said integrating means develops at all times during said program duration an indication representative of the number of said receiving stations which have been brought to said predetermined condition during said program.

2. The system as set forth in claim 1, wherein each of said load means includes a resistor and an additional switch means in series connection, and switch operating means for closing said additional switch means for said predetermined period to connect said resistor in shunt with said electric circuit.

3. The system as set forth in claim 1, wherein said switch operating means includes a further source of electric current, an electric motor in circuit with said first-mentioned switch means and said further source of electric current, cam means driven by said motor, and contact means operated by said cam means for establishing an energizing connection between said motor and said further source when said motor is operated by said first-mentioned switch means, said additional switch means being operatively connected to said cam means for operation thereby to connect said resistor in shunt with said electric circuit for said predetermined time period.

4. The system as set forth in claim 1, wherein each of said load means includes a capacitor and a resistor, said switch means being arranged in circuit with said capacitor, said resistor and said electric circuit for selectively shunting said resistor across said capacitor and for connecting the capacitor to said current source by way of said circuit for charging therefrom when said switch means is actuated by said control means.

5. A system as set forth in claim 1, wherein said electric circuit includes an impedance element in series connection with said source, whereby the potential appearing across said impedance element constitutes a measure of the number of said load means instantly connected to said circuit, wherein said integrating means comprises means operable to provide an indication representative of the integral over said program duration of the potential appearing across said impedance element, and circuit means applying the potential appearing across said impedance element to said integrating means.

6. The system as set forth in claim 1, wherein said electric circuit includes a source of electric current and wherein each of said load means includes a capacitor and a resistor, said switch means being arranged in circuit with said capacitor, said resistor and said electric circuit for selectively shunting said resistor across said capacitor and for connecting said capacitor to said electric circuit for charging from said source.

7. A broadcasting system, comprising, in combination:
 (a) a central station,
 (b) a plurality of receiving stations, and
 (c) an electrically conductive network including a pair of electrical conductors extending between said central station and each of said receiving stations,
  (1) said central station including a source of signals representing programs having a predetermined duration, a source of electric current and a resistor connected in series between said conductors, whereby the potential across said resistor is a measure of the current drawn from said source, electrical integrator means for registering a value proportional to the integral over a predetermined time interval of a potential applied thereto, and circuit means connecting said impedance element to said integrator means for applying to the latter said potential across said impedance element,
  (2) said receiving stations each including program receiving means, personally operable control means for conditioning said receiving means for receiving said program signals, load means including capacitor means and switch means actuated when said receiving means is so conditioned for connecting said capacitor for charging from said source via said network, thereby to draw appreciable current from said network over a predetermined period substantially shorter than said duration interval, said current having over said period a predetermined value of time integral,
  (3) whereby the value registered by said integrator means is at all times during said program a measure of the number of receiving stations conditioned during said program.

8. The system as set forth in claim 7, wherein said source of current is a constant voltage source.

9. A system as set forth in claim 7, wherein said load means each include a capacitor, said switching means being operative to connect said capacitor in shunt with said network.

10. A system as set forth in claim 7, wherein said personally operable means is a coin-freed device responsive to payment of a predetermined fee for conditioning said receiving means for receiving said program signal.

11. A broadcasting system comprising, in combination:
 (a) a central station,
 (b) a plurality of receiving stations, and
 (c) an electrically conductive network including a pair of electrical conductors extending between said central station and each of said receiving stations,
  (1) said central station including a resistor and a source of constant voltage in series connection between said conductors, whereby a potential proportional to the current drawn by said network from said source is developed across said resistor, a source of program signals, means applying said signals to said conductors, electrical integrating means for registering a value proportional to the integral over a predetermined time interval of the value of an applied potential, and circuit means connecting said integrating means to said resistor for applying said potential developed across said resistor to said integrating means,
  (2) each receiving station including program receiving means, a load circuit, control means for making said receiving means effective to receive said program signals and for simultaneously initiating the operation of a timer controlling switch, means operable to connect said load circuit to said network for a predetermined period of time substantially shorter than said program duration, said load circuit including a resistor and said timer-operated switch means in series connection.

References Cited by the Examiner
UNITED STATES PATENTS

| | | | |
|---|---|---|---|
| 3,051,775 | 8/1962 | Novak et al. | 325—31 |
| 3,054,858 | 9/1962 | Reid | 325—31 |
| 3,126,513 | 3/1964 | Kamen | 179—2 |
| 3,172,948 | 3/1965 | Rubenstein | 325—31 |

DAVID G. REDINBAUGH, *Primary Examiner.*

B. V. SAFOUREK, *Assistant Examiner.*